(No Model.)
C. F. EBLING.
TEA KETTLE.
No. 523,627. Patented July 24, 1894.
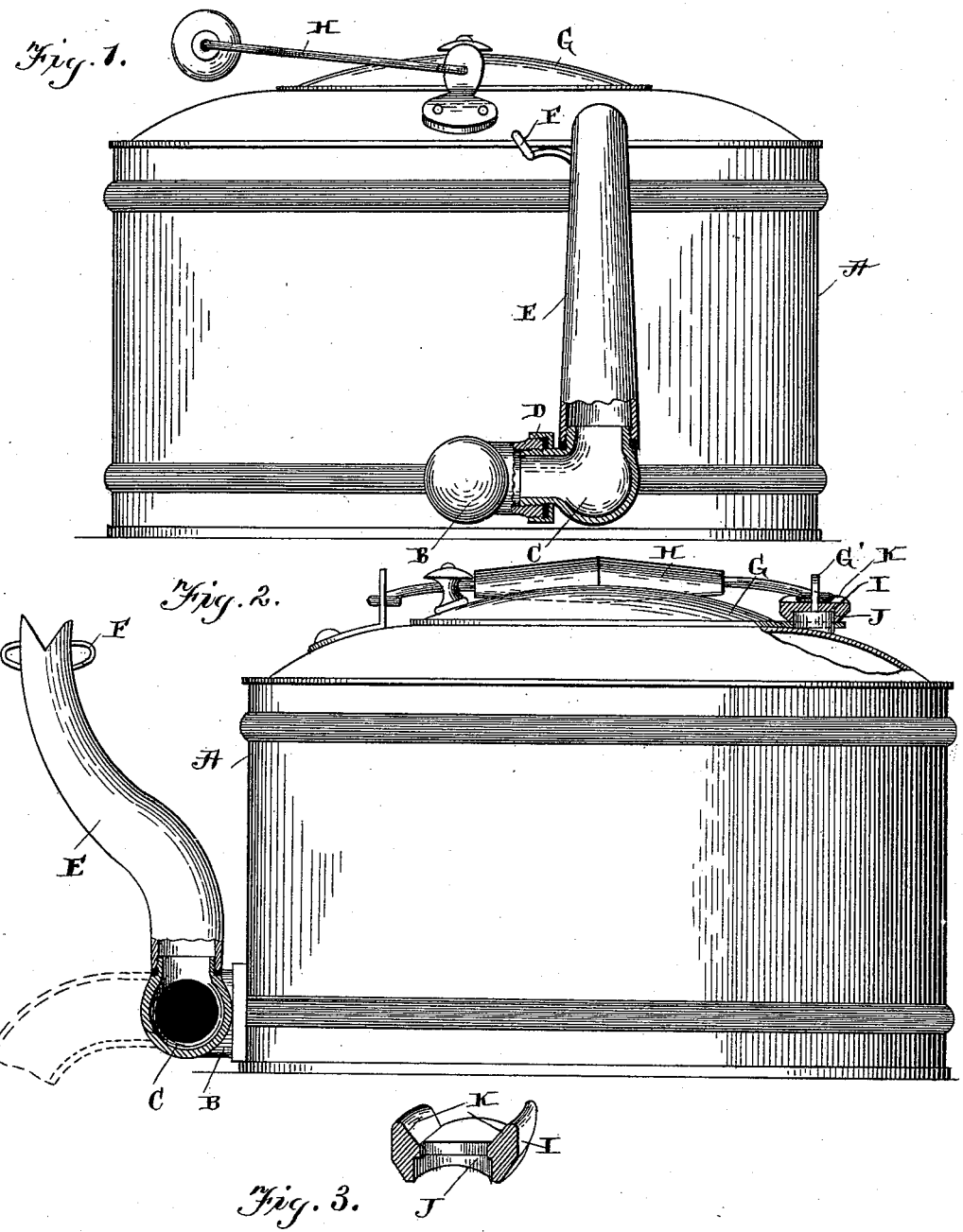
Witnesses
Geo. E. Frech
James W. Berans
Inventor
C. F. Ebling
By Lehmann Pattison & Hecht
attys

UNITED STATES PATENT OFFICE.

CHARLES FREDERICK EBLING, OF CALLENSBURG, PENNSYLVANIA.

TEA-KETTLE.

SPECIFICATION forming part of Letters Patent No. 523,627, dated July 24, 1894.

Application filed May 9, 1894. Serial No. 510,635. (No model.)

*To all whom it may concern:*

Be it known that I, CHARLES FREDERICK EBLING, of Callensburg, in the county of Clarion and State of Pennsylvania, have invented certain new and useful Improvements in Tea-Kettles; and I do hereby declare the following to be a full, clear, and exact description of the invention, such as will enable others skilled in the art to which it pertains to make and use it, reference being had to the accompanying drawings, which form part of this specification.

My invention relates to an improved tea kettle; and the object of the same is to provide a kettle with an improved spout which may be turned down when water is wanted, thus avoiding the necessity of lifting the kettle, and a further object of the invention is to so arrange the handle as to prevent it from sagging down on the kettle and thereby getting heated.

With these objects in view the invention consists in the novel features of construction hereinafter fully described and claimed, and illustrated in the accompanying drawings, in which—

Figure 1 is a front elevation of the kettle shown partly in section. Fig. 2 is a side elevation of the same. Fig. 3 is a detail view of the pintle upon which the lid turns and also the washer for holding the same in position thereon as well as supporting the handle.

A is the kettle body having at its lower front side the elbow B which is screw threaded and upon its exterior also a short distance inward from its end. Removably secured in said elbow is the second elbow C which is screw threaded at its inner end as shown and carried thereby is the coupling and packing ring D which engages the exterior screw threads of elbow B, thus forming a water tight joint, while at the same time the spout is perfectly free to turn downward when water is to be drawn from the kettle.

Removably secured to the elbow C is the spout E which is adapted to move in a vertical circle arc and which carries the hand hold F which may be conveniently grasped for effecting this movement. The spout remains in a vertical position at all times excepting when water is being drawn and by turning the same down all lifting of the kettle for this purpose is avoided.

The lid G of the kettle turns on a vertical pintle projecting from the kettle top, the said pintle terminating in a perforated vertical lip G' through which the end of the handle H is projected as shown. Fitting down over the lip is the washer I having the annular depression J on its under side for fitting over the end of the pintle, thereby holding the lid firmly in place and preventing vertical displacement. Upon the upper side of the washer and upon opposite sides of the lip G' are the lugs K for supporting the handle H when turned down as shown, in such a position as to keep the hollow metallic hand hold L from contact with the kettle. The latter is therefore at all times sufficiently cool to enable the operator to easily grasp it and lift the kettle thereby.

Having thus fully described my invention, what I claim as new, and desire to secure by Letters Patent, is—

1. The combination with the kettle, the pintle and the handle, of the washer mounted on the pintle between the handle and kettle, and the lugs on the washer for supporting the handle in the manner shown and described.

2. The combination of a tea kettle, an interiorly and exteriorly screw threaded elbow connection secured thereto, a second elbow screw threaded at its inner end where it engages the first named elbow, a combined coupling and packing ring carried by the second elbow which engages the exterior threads of the first named elbow, and a spout carried by the second elbow, substantially as shown and described.

3. The combination of the kettle, the pintle, the perforated ear, the lid turning on the pintle, the washer recessed on its under side to fit down over the pintle, the lugs on the washer, and the handle, substantially as shown and described.

In testimony whereof I affix my signature in presence of two witnesses.

CHARLES FREDERICK EBLING.

Witnesses:
ALEXANDER WILSON,
F. L. SHALLENBERGER.